United States Patent [19]
Pieters et al.

[11] Patent Number: 6,007,312
[45] Date of Patent: Dec. 28, 1999

[54] ENCAPSULATED MAGNET FOR MAGNETIC DRIVE PUMPS

[75] Inventors: Ferdinandus A. Pieters, Camas; Kenneth E. Knodell, Vancouver, both of Wash.

[73] Assignee: Micropump, Inc., Vancouver, Wash.

[21] Appl. No.: 09/006,152

[22] Filed: Jan. 13, 1998

[51] Int. Cl.$^6$ .................................................. F04B 17/00
[52] U.S. Cl. ............................ 417/420; 335/302; 29/607
[58] Field of Search .................................. 417/420, 410.1; 335/302, 306, 303; 310/103; 29/607

[56] References Cited

U.S. PATENT DOCUMENTS

| | | | |
|---|---|---|---|
| 4,414,523 | 11/1983 | Pieters ...................................... | 335/302 |
| 5,464,333 | 11/1995 | Okada et al. ............................ | 417/420 |
| 5,691,681 | 11/1997 | Okugawa ................................ | 335/284 |
| 5,692,882 | 12/1997 | Bozeman et al. ........................ | 417/45 |
| 5,708,313 | 1/1998 | Bowes et al. ........................... | 310/90.5 |
| 5,763,973 | 6/1998 | Cramer ..................................... | 310/103 |

*Primary Examiner*—Andrew M. Dolinar
*Assistant Examiner*—Mahmoud M. Gimie
*Attorney, Agent, or Firm*—Hill & Simpson

[57] ABSTRACT

An encapsulated magnet assembly has a magnet encapsulated during a two-step molding process. The first step includes molding a first molded section over a magnet assembly. The second step of the process includes molding a second molded section over the magnet and the first molded section in such a manner that the entire magnet is covered by the two molded sections completely. A first parting line is defined between the first and second molded sections along an elongate tapered section of the first molded section at the one end of the assembly. A second parting line is defined between the first and second molded sections at a dovetail on the first molded section. An outwardly tapered surface is provided on the dovetail. The two parting lines define leak-free seams between the two molded sections thereby sealingly encapsulating the magnet within the two molded sections.

21 Claims, 2 Drawing Sheets

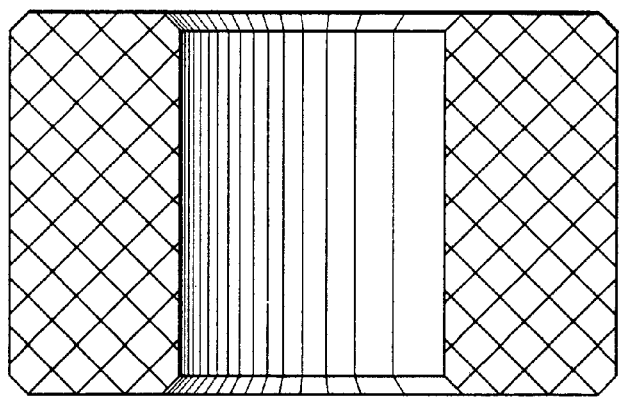
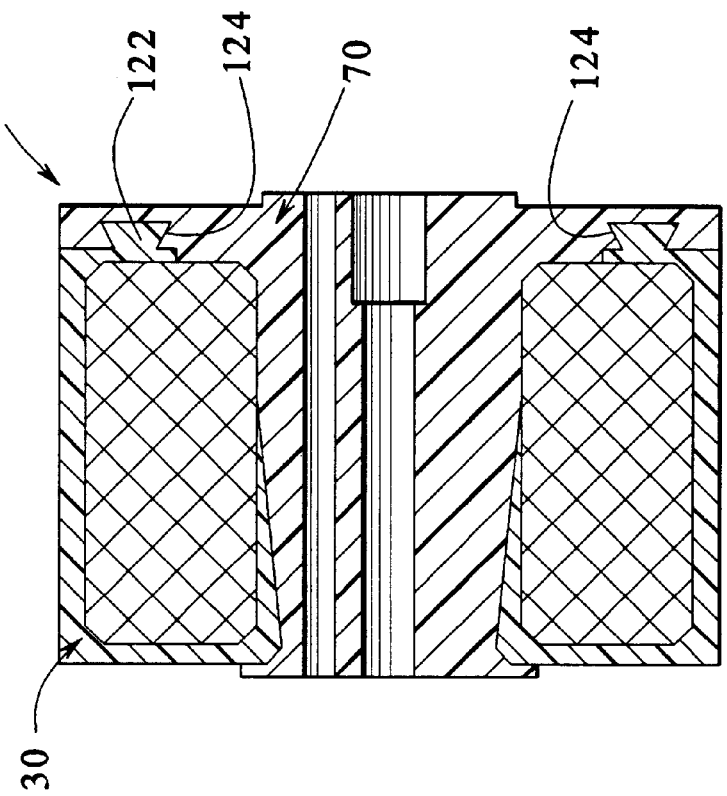

ENCAPSULATED MAGNET FOR MAGNETIC DRIVE PUMPS

BACKGROUND OF THE INVENTION

The present invention relates in general to magnetic drive pumps, and in particular, to an encapsulated magnet for a magnetic drive pump and method of making the same.

A typical use for the present invention is in a pump having a magnetic drive. A magnetic drive pump has an outer annular magnet turned or rotated by a motor. An annular inner magnet is disposed within the outer magnet and is carried on a pump shaft. The inner magnet is isolated from the outer magnet by a thin metallic or plastic cup.

The inner magnet of such pumps includes a magnet and flux ring assembly which operates in the process fluid that is moved through a system by the pump. If the process fluid such as water contacts the assembly, the magnet and flux ring may corrode or rust. Additionally, the assignee of the present invention has researched using rare earth materials for the magnet for use in magnetic drive pumps. These rare earth materials are highly susceptible to corrosion when immersed in fluids such as water.

Several methods have been tried in order to correct the problem. One presently used method includes placing the magnet and flux ring inside a stainless-steel shell and molding an outer cover over the exposed assembly. Such a construction, disclosed in commonly assigned U.S. Pat. No. 4,414,523, is not adequate for all applications. Additionally, various coatings and platings have been applied to the magnet outer surface. Such methods and materials are not known to withstand contact with all process fluids and to maintain a leak-free encapsulation of the magnet.

One manufacturer, March Pump, has developed an over-molded vane pump using a two-step molding process for the magnet and impeller. The seam between the first molding step material and the second molding step material does not ensure a leak-free joint.

SUMMARY OF THE INVENTION

Because of the above-described problems, there is a need in the art for a leak-free encapsulated magnet using widely acceptable materials and yet being of a relatively low-cost construction. The need in the art requires a highly reliable leak-free magnet construction of relatively low cost which will prevent rust and corrosion of the magnet operating in process fluids of pump systems.

The present invention discloses an over-molded magnet of a leak-free construction wherein the magnet is encapsulated using a two-step molding process. The seams or parting lines between the material of the first and second molding steps are formed in such a manner providing an extremely reliable seal.

In one embodiment, an encapsulated magnet assembly has a magnet with an inner and outer surface, first and second ends, and a longitudinal axis. The assembly has a first molded section formed over a portion of the annular magnet. The first molded section has an elongate tapered section extending along one of the surfaces of the magnet from adjacent the first end. The first molded section also has an axially extending annular dovetail adjacent the second end of the magnet. The magnet assembly also has a second molded section formed over a portion of both the magnet and the first molded section. A first parting line is defined between the first and second molded sections along the elongate tapered section. A second parting line is defined between the first and second molded sections at the annular dovetail. The first and second parting lines are adapted to sealingly encapsulate the magnet within the first and second sections.

One advantage of the present invention is that the over-mold construction produces a leak-free protective covering for the magnet. An additional advantage of the present invention is that when the second molded section is molded over the first, the long tapered section and the dovetail section form extremely reliable seals between the two molded sections. A further advantage of the present invention is that the long tapered section and the dovetail section enhance the plastic welding characteristics between the two molded sections as the second material is molded over the first material. A still further advantage of the present invention is that the two-step over-mold construction produces an extremely reliable leak-free magnet encapsulation at relatively low manufacturing cost.

These and other objects, features and advantages of the invention will be readily apparent from the following description of the preferred embodiments thereof taken in conjunction with the accompanying drawings. Variations and modifications may be effected without departing from the scope and spirit of the present invention and novel concepts of the overall disclosure.

BRIEF DESCRIPTION OF THE DRAWINGS

FIG. 5 illustrates a cross-section along a longitudinal axis of another magnet to which the present invention is directed.

FIG. 6 illustrates a cross-section taken along line VI—VI of the magnet of FIG. 5 after the first and second molding steps of the invention are done according to the process of the present invention.

DETAILED DESCRIPTION OF THE PREFERRED EMBODIMENTS

Figure 1:
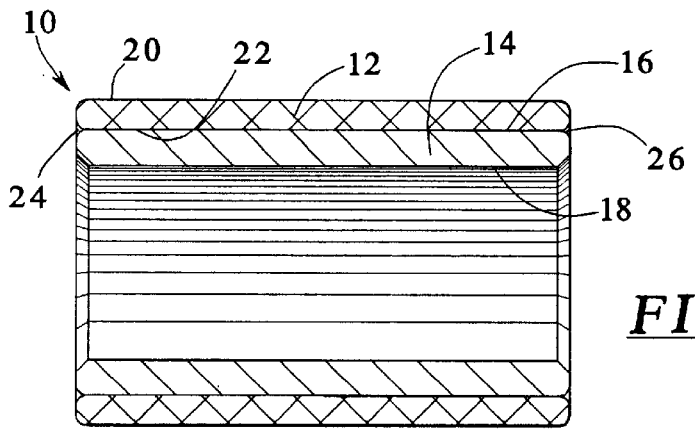
FIG. 1 illustrates a cross-section along a longitudinal axis of a magnet assembly to which the present invention is directed.

The present invention is directed to a magnet assembly which is encapsulated in a plastic material and to a method of making such an assembly. It is intended that the present invention apply to any magnet configuration or a magnet and flux ring combination as well as to any type of magnet or flux ring material and size, as limited only by the molding process of the invention. In that regard, attention is now directed to the drawing Figures.

FIG. 1 illustrates a magnet assembly 10 for use in integral series magnetic drive DC brushless pumps or other such magnetic drive pumps. The magnet assembly 10 includes a magnet ring 12 of an elongate circular cylinder construction typically formed of a magnetic ceramic material. A flux ring 14 also of an elongate circular cylinder construction is adhered within the interior of the magnet ring 12. The flux ring 14, typically formed of steel, has an exterior cylindrical surface 16 and an interior cylindrical surface 18. The interior surface 18 defines a hollow interior of the magnet assembly 10. The exterior surface 16 abuts against and is suitably adhered to an interior cylindrical surface 22 of the magnet ring 12. The magnet ring 12 has an exterior cylindrical surface 20 defining an exterior surface of the magnet assembly 10. The flux ring exterior surface 16 is adhered to the magnet ring interior surface 22 using a suitable relatively high temperature adhesive for securely holding the two components together. As illustrated in FIG. 1, the joint between the magnet ring 12 and the flux ring 14 defines grooves 24 and 26 at opposite ends of the magnet assembly 10. The opposite ends of the magnet assembly 10 may alternatively be flat without departing from the scope of the present invention although the grooves 24 and 26 assist in producing a suitable encapsulated magnet assembly.

As will be evident to those skilled in the art, the invention is not to be limited to the type of materials utilized to produce the magnet ring 12 and the flux ring 14. Any suitable ceramic or metallic material may be used for the magnet without departing from the scope of the present invention. Similarly, any suitable steel or other metal may be used for the flux ring 14. Additionally, the shape, contour and construction of the magnet assembly 10 may vary widely without departing from the scope of the invention. For example, FIG. 5 illustrates an alternative embodiment of a magnet, described below in greater detail, for which the present invention is suitable. A typical magnet assembly for a magnetic pump rotates on a shaft about its longitudinal axis. This axis is designated axis "A" for convenience of the present discussion.

Figure 2:
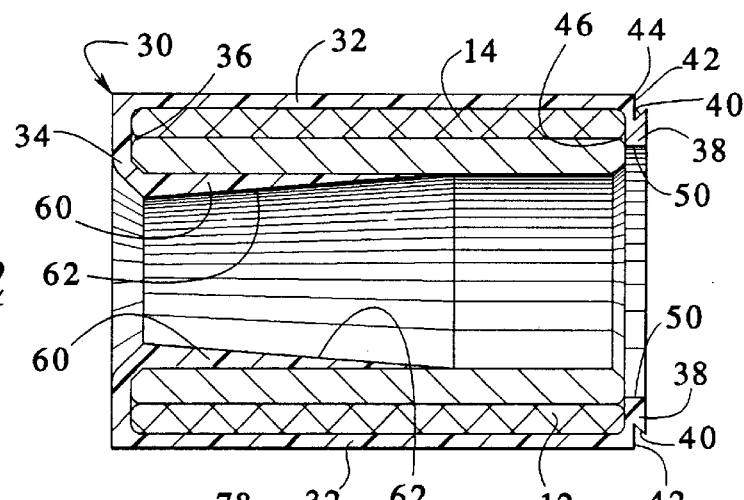
FIG. 2 illustrates a cross-section taken along line II—II of the magnet and flux ring of FIG. 1 after the first molding step is done according to the process of the present invention.

FIG. 2 illustrates the magnet assembly 10 wherein a first molded section 30 is molded over a portion of the magnet assembly. The first molded section 30 includes a thin wall section 32 covering essentially the entire exterior surface 20. An end wall 34 covers one end of the magnet assembly 10 and is perpendicular to the axis "A". An extension 36 of the end wall 34 protrudes inward into the groove 24. The extension 36 provides a positive retention and position feature for the first molded section 30 over the magnet assembly 10.

An annular dovetail 38 is formed at the opposite end of the magnet assembly 10 extending longitudinally from the opposite end of the magnet assembly and spaced radially from the axis "A". The dovetail 38 includes a tapered surface 40 which is tapered radially outward, in the present embodiment about 45°, relative to the axis of the magnet assembly 10. In a particularly preferred variation, a double or dual dovetail such as shown in FIG. 6 may be used. The dovetail 38 also includes an end wall surface 42 which is perpendicular to the axis "A" of the magnet assembly extending from the dovetail 38 at one end outward to the outer edge at the thin wall section 32.

An extension 46 protrudes into the groove 26 between the magnet ring 12 and flux ring 14. This extension 46 again assists in positively retaining and positioning the first molded section over the magnet assembly.

In the present embodiment of FIG. 2, the dovetail includes an inner surface 50 which is also tapered slightly radially outward to assist in separating the mold cavity sections as this component is fabricated. As will be evident to those skilled in the art, the inner surface 50 may be essentially parallel to the axis of the magnet assembly 10, may taper outward as illustrated in FIG. 2, or may taper inward defining another tapered surface as is illustrated and described below relative to the embodiment of FIG. 5.

An elongate tapered section 60 is formed adjacent and along a portion of the interior surface 18 of the flux ring 14. The elongate section 60 extends from the end of the magnet assembly adjacent the end wall 34. The elongate tapered section 60 tapers from a maximum thickness adjacent the end wall 34 to a minimum thickness or point at its other end terminating somewhere along the length of the magnet assembly 10. In the present embodiment, the length of the elongate tapered section 60 extends about two thirds the length of the magnet assembly. The longer the elongate tapered section 60, the more reliable the leak-free characteristics for the molded assembly. The elongate tapered section 60 includes an inner exposed surface 62 which slightly tapers away from the axis "A" of the magnet assembly moving from the end wall 34 to the end of the section 60.

Figure 3:
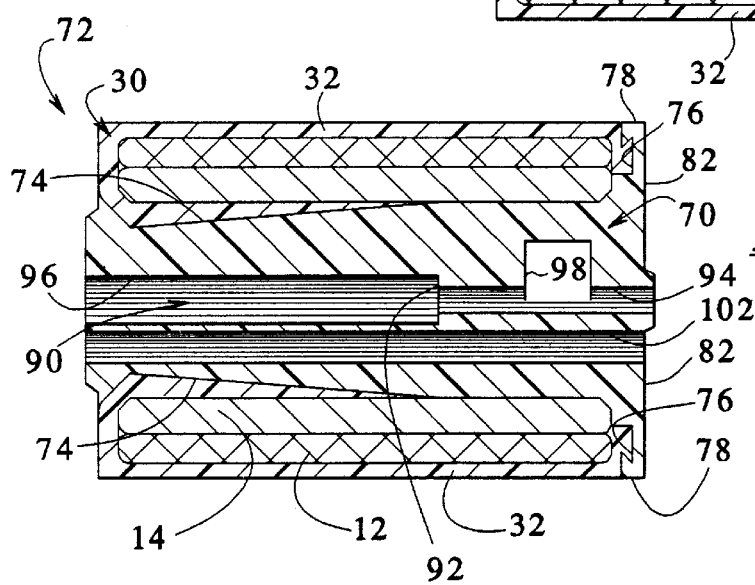
FIG. 3 illustrates a cross-section taken along line III—III of the magnet and flux ring of FIG. 1 after the second molding step is done according to the process of the present invention.

FIG. 3 illustrates the magnet assembly 10 after the process of molding a second molded section 70 over the first molded section 30 completing the construction of an encapsulated magnet assembly 72. The second molded section 70 in the present embodiment extends the entire length of the magnet assembly 10 essentially from the surface of the end wall 34 to beyond the tip of the dovetail 38 encapsulating the dovetail. A first parting line 74 is defined between the first and second molded sections 30 and 70 along the inner tapered surface 62 of the tapered section 60. The length of the parting line 74 and the slight taper produce an extremely reliable leak-free seal between the two sections.

A second parting line 76 is defined between the dovetail 38 and end wall surface 42 and the surrounding material of the second molded section 70. This second parting line 76, because of its contour and length, also produces an extremely reliable seal between the first and second molded sections.

The end of the second molded section 70 adjacent the dovetail 38 preferably defines a remaining portion 78 of the thin wall section 32 over the magnet assembly 10 of the encapsulated magnet 72. The second molded section also defines a generally perpendicular end wall 82 beyond the end of the dovetail 38 of the encapsulated magnet 72.

Figure 4:
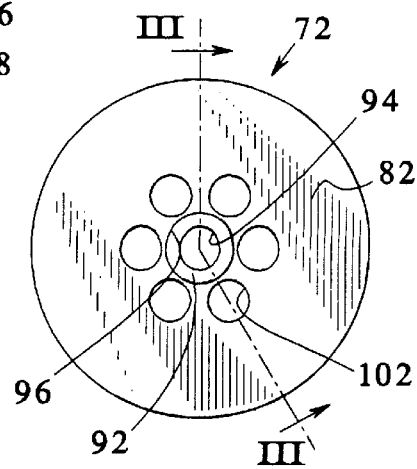
FIG. 4 illustrates a cross-section taken along line IV—IV of the magnet assembly of FIG. 3.

As best illustrated in FIGS. 3 and 4, the encapsulated magnet also includes an axial bore 90 extending the entire length of the second molded section. In the present embodiment the axial bore includes a shoulder or step 92 defining a first bore section 94 and a larger diameter second bore section 96 separated by the step. An indentation or key 98 extends into the second molded section 70 via the wall of the first bore section 94. The axial bore 90 is intended to receive a stepped gear shaft (not shown) therethrough for rotatably mounting the encapsulated magnet assembly 72 within a device or pump. The key 98 is intended to receive therein a protrusion or locking member (also not shown) for securing the encapsulated magnet assembly 72 to the rotary shaft.

The key 98 in the present embodiment may be eliminated. An encapsulated magnet constructed according to the invention may also be attached to a gear shaft and aligned therewith by other means or methods. For example, the gear shaft of the pump may include a splined shaft or a hex shaped shaft portion which corresponds to a similarly formed spline or hex shaped axial bore of the encapsulated magnet. Other shapes, configurations or methods may be utilized to secure and orient the encapsulated magnet to a device without departing from the scope of the present invention.

Also illustrated in FIGS. 3 and 4, a plurality of longitudinal through-bores 102 are spaced radially outward relative to the axial through-bore 90. The through-bores 102 are intended to allow process fluid to pass through the encapsulated magnet 72 during operation of a device in which the assembly is installed and yet permit no contact of the process fluid with magnet assembly from within. Alternatively, the through-bores 102 may be adapted to receive rotary balance weights to off-set any imbalance in the magnet 72. In the present embodiment, the longitudinal bores 102 extend essentially parallel to the axial through-bore 90.

FIGS. 5 and 6 illustrate an alternative embodiment of a magnet to which the invention is applicable. Only the components having a different construction than the above described embodiment will be given new element numbers. FIG. 5 illustrates a magnet ring 120 similar in construction to the magnet ring 12 but excluding a flux ring. FIG. 6 illustrates the magnet ring 120 encapsulated by the first and second molded sections 30 and 70 which are essentially the same as those described above with the construction of the dovetail construction. A dovetail 122 of the present embodiment includes a radially outwardly tapered surface 40 similar to the construction of the prior embodiment. An inwardly tapered surface 124 is included opposite the surface 40. The dual tapered dovetail 122 illustrated in FIG. 6 provides for additional retention and surface contact between the first and second molded sections at the dovetail and improves the leak-free characteristics of the second parting line 76.

The contour and configuration of the locking projection, described in the present embodiments as the dual dovetail 122 or the single dovetail 38, may take on other forms as well without departing from the scope of the present invention. The projection may be in the form of a T, an inverted L, or a raised bead as well as other configurations. The intent of the projection is that it provide a non-linear contact surface between the first and second molded sections 30 and 70 providing a leak-free seal as well as a positive interlock between the two molded sections. The single dovetail 38 and double dovetail 122 constructions have been described in the present embodiment merely as illustrative examples of the invention.

The molding process for the encapsulated magnet assemblies of the above embodiments is now described below. The process is described generally for illustrating the invention although the steps described may be altered in numerous ways without departing from the scope of the present invention.

To produce an encapsulated magnet assembly according to the invention, a magnet assembly is preheated and inserted into a first mold cavity. The first molded section 30 is molded around the magnet assembly 10, 120 and may be molded using any one of many known molding processes. It is desired however that the mold cavity precisely define the shape of the first molded section relative to the magnet assembly held within the cavity. A core pin is inserted into the magnet assembly having a tapered outside diameter which defines the tapered inside diameter or surface 62 shown in FIG. 2. The first mold section and magnet assembly are then removed from the mold and after proper cooling, the tapered surfaces 40, 50, 124 of the dovetail 38, 122 are cut or machined if not already formed by the shape of the mold cavity. Further, the gate remnants and any flash or burrs left on the plastic first molded section are removed from the assembly.

The magnet assembly 10, 120 and first molded section 30 are then again preheated and inserted into a second mold cavity. The second molded section 70 is molded around the first molded section and the magnet assembly according to one of many known molding processes. After the second molded section 70 is molded, the assembly is removed from the second mold cavity and allowed to cool under adequate conditions preventing damage to the component. The gate remnants and any flash or burrs are removed at this time. The magnet may then be magnetized according to the characteristics necessary for a particular device or pump into which the magnet assembly will be installed.

Example of the Molding Process

A particular example of the molding process of the invention is now described in order to more clearly set forth the process of the invention. A magnet and flux ring assembly was preheated to 275° F. and inserted into a mold also preheated to 275° F. A plurality of pellets of PPS material were placed in an injection cavity which communicates with the barrel and nozzle of an injection machine and were preheated to a melt temperature of the material or in this case to about 600° F. The nozzle in the present example was preheated to 630° F. to ensure that the material injected into the mold cavity was melted.

To mold the first molded section over the magnet and flux ring assembly, an injection pressure of 925 PSI was utilized, measured at the injection nozzle. The injection time for the first molded section was 1.5 minutes. Upon completion of the first injection sequence, the first molded section and the magnet assembly were cooled for 2 hours at a rate of 100° F./hr.

The assembly and first molded section were then preheated again to 275° as was the second mold cavity into which it was placed. Additional pellets of a PPS material were then placed into the injection barrel and injected into the second mold cavity around the first molded section and the magnet assembly with a medium injection speed at a pressure of 925 PSI to partially remelt the first molded section. The material of the second molded section was again heated to about 600° F. The injection time was again 1.5 seconds for the second molded section. Upon completion of the injection process for the second molded section, the second mold cavity was again held in the second mold cavity for 8 seconds under pressure at about 400 PSI, then allowed to set in the mold for an additional 23 seconds, after which time the encapsulated magnet assembly was removed from the cavity and allowed to cool for 2 hours at a rate of 100° F./hr. During the remelting of the first molded section, the dovetail or annular projection and the inner diameter tapered section become melted and plastically weld to the second molded section material. The time, temperature, material selection and material cross-section determine the quality of the plastic weld at the parting lines.

As will be evident to those in the art, many known molding processes may be used including insert injection molding, rotational molding, high temperature flow molding, or high pressure injection molding. It is preferred however that the second molding step take place at a sufficiently high temperature to produce at least a partial plastic welded seam at the first and second parting lines 74, 76. The plastic weld further enhances the leak-free characteristics of an encapsulated magnet 72 constructed according to the invention.

The materials used to produce the first and second plastic molded sections may also vary without departing from the scope of the present invention. In the present embodiment, an injection moldable plastic material such as PHILLIPS brand polyphenelyne sulfide (PPS) in the form of pellets may be utilized. In developing the present invention, a polyphenelyne sulfide base material with about 30% polyacrylnitrile carbon fiber and 15% polytetrafluoroethylene was utilized. It is preferred that the materials selected be suitably durable so as not to degrade, corrode or otherwise deteriorate when continually exposed to a particular process fluid for a given pump application.

The present invention also contemplates use of one material for the first molded section 30 and a different material for the second molded section 70. The second molded section 70 which defines the core diameter of the axial bore 90 may be molded from a separate stronger, more expensive material than the first molded section 30 in order to provide additional strength to accommodate rotational torque applied to the assembly 72 during operation of a device or pump. One disadvantage of using two different materials is that there might be a slight air gap between the outside diameter of the ceramic magnet caused by the thickness of the plastic material molded and the slightly different shrinkage characteristics during cooling. This slight air gap may result in some loss of flux torque capability of the encapsulated magnet assembly and yet retain all of the leak-free characteristics. However, by using two different materials, a cost savings is realized by using a different cheaper plastic material for molding the less critical first molded section over the magnet assembly.

While discussions regarding this invention have been directed to its particular application with respect to magnetic drive pump devices, it will be understood by those skilled in the art that the principles underlying this invention are generally applicable to producing encapsulated magnets for use in many applications. In essence, these principles apply to any environment in which a magnet is to be exposed to corrosive substances and it is desired that the magnet not corrode, rust or otherwise deteriorate.

It should be understood that various changes and modifications to the presently preferred embodiments described herein will be apparent to those skilled in the art. Such changes and modifications may be made without departing from the scope and spirit of the present invention and without diminishing its attendant advantages. It is, therefore, intended that such changes and modifications be covered by the appended claims.

What is claimed is:

1. An encapsulated rotary magnet assembly comprising:
   an annular magnet having an inner and an outer surface, first and second ends, and a longitudinal axis;
   a first molded section formed over a portion of the annular magnet and having an elongate tapered section extending along one of the surfaces of the magnet from adjacent to the first end, and an axially extending annular contoured projection adjacent the second end of the magnet;
   a second molded section formed over a portion of both the magnet and the first molded section; and
   first and second parting lines defined between the first and second sections along the elongate tapered section and the annular contoured projection, respectively, the parting lines adapted to sealingly encapsulate the magnet within the first and second molded sections.

2. The rotary magnet assembly according to claim 1, wherein the annular contoured projection further comprises:
   a dovetail having an outer surface tapered radially outward relative to the longitudinal axis of the magnet.

3. The rotary magnet assembly according to claim 2, wherein the outer surface is tapered about 45° relative to the longitudinal axis.

4. The rotary magnet assembly according to claim 2, wherein the dovetail further comprises:

a double dovetail having an inner surface tapered radially inward relative to the longitudinal axis of the magnet.

5. The rotary magnet assembly according to claim 4, wherein the inner surface is tapered about 45° relative to the longitudinal axis.

6. The rotary magnet assembly according to claim 1, wherein the first and second sections are molded from an injection moldable plastic.

7. The rotary magnet assembly according to claim 1, wherein the first and second sections are molded from a polyphenelyne sulfide base material.

8. An encapsulated rotary magnet assembly comprising:
   an annular magnet having an inner and an outer surface, first and second ends, and a longitudinal axis;
   a first section molded from a thermoplastic material formed over a portion of the annular magnet, the first section having an elongate tapered section extending along a portion of the inner surface of the magnet from adjacent the first end, and an axially extending annular contoured projection extending from the first section adjacent the second end of the magnet;
   a second section molded of a thermoplastic material formed over a portion of both the magnet and the first section so that the second section completely covers both the annular contoured projection and the elongate tapered section;
   an axial bore formed through the second molded section concentric with the longitudinal axis of the magnet; and
   first and second parting lines defined between the first and second sections along the elongate tapered section and the annular contoured projection, respectively, the parting lines adapted to sealingly encapsulate the magnet within the first and second sections.

9. The rotary magnet assembly according to claim 8, further comprising:
   a plurality of longitudinal bores formed through the second section generally parallel to the axial bore and spaced radially outward therefrom.

10. The rotary magnet assembly according to claim 8, wherein a plastic weld is formed between the first and second sections along each of the first and second parting lines.

11. A method of fabricating an encapsulated rotary magnet assembly, the method comprising the steps of:
    providing an annular magnet having an inner and an outer surface, first and second ends, and a longitudinal axis;
    molding a first section of a thermoplastic material over a portion of the annular magnet, the first section having an elongate tapered section extending along the inner surface of the magnet from adjacent the first end, and an axially extending annular contoured projection adjacent the second end of the magnet;
    molding a second section of a thermoplastic material over a portion of both the magnet and the first molded section defining first and second parting lines between the first and second sections along the elongate tapered section and the annular contoured projection, respectively, so that the magnet is sealingly encapsulated within the first and second sections.

12. The method according to claim 11, further comprising:
    the step of forming at least one tapered surface on the annular contoured projection tapered relative to the longitudinal axis of the magnet.

13. The method according to claim 11, further comprising:

forming an inner surface on the annular contoured projection which is tapered inwardly relative to the longitudinal axis of the magnet.

14. The method according to claim 13, wherein the inner surface is tapered about 45° relative to the longitudinal axis.

15. The method according to claim 11, further comprising:

the step of forming an outer tapered surface on the annular contoured projection tapered outwardly relative to the longitudinal axis of the magnet.

16. The method according to claim 15, wherein the outer tapered surface is tapered about 45° relative to the longitudinal axis.

17. The method according to claim 11, wherein the step of molding the second section further comprises:

molding the second section over the first section in such a manner that the first and second sections are thermally welded to one another along both the elongate tapered section and the annular contoured projection.

18. The method according to claim 11, further comprising:

the step of preheating the annular magnet prior to molding the first section over the magnet.

19. The method according to claim 18, further comprising:

the step of cooling the annular magnet and the first section after molding the first section over the annular magnet.

20. The method according to claim 19, further comprising:

the step of preheating the annular magnet prior to molding the second section.

21. The method according to claim 20, further comprising:

the step of cooling the encapsulated magnet assembly after molding the second section.

* * * * *